United States Patent

[11] 3,625,323

| [72] | Inventor | Richard Hetmann<br>Tamm, Germany |
|---|---|---|
| [21] | Appl. No. | 849,388 |
| [22] | Filed | Aug. 12, 1969 |
| [45] | Patented | Dec. 7, 1971 |
| [73] | Assignee | Firma Dr.-Ing. h. c. F. Porsche KG<br>Zuffenhausen, Germany |
| [32] | Priority | Aug. 24, 1968 |
| [33] | | Germany |
| [31] | | P 17 80 276.5 |

[54] TORQUE CONVERTER WITH DUAL CLUTCHES
10 Claims, 1 Drawing Fig.

[52] U.S. Cl. .................................................. 192/3.26,
192/48.8, 192/3.28
[51] Int. Cl. .................................................. F16h 45/02
[50] Field of Search............................................. 192/3.26,
3.27, 3.25, 3.32, 3.2

[56] References Cited
UNITED STATES PATENTS

| 2,264,478 | 12/1941 | Lowther....................... | 192/3.26 |
| 2,642,168 | 6/1953 | Black et al.................... | 192/3.26 |

FOREIGN PATENTS

| 1,287,432 | 2/1962 | France ........................ | 192/3.26 |

Primary Examiner—Benjamin W. Wyche
Attorney—Craig, Antonelli and Hill

ABSTRACT: A clutch assembly for compound transmissions including a hydrodynamic torque converter and a change-speed gear. The gear input shaft can be selectively connected with the turbine impeller of the torque converter by means of a separating clutch or the input shaft can be selectively connected to the pump impeller of the torque converter by means of a bypass clutch. Both the separating clutch and bypass clutch are located in a structural group within an oil-free zone between the torque converter and the change-speed transmission.

PATENTED DEC 7 1971 3,625,323
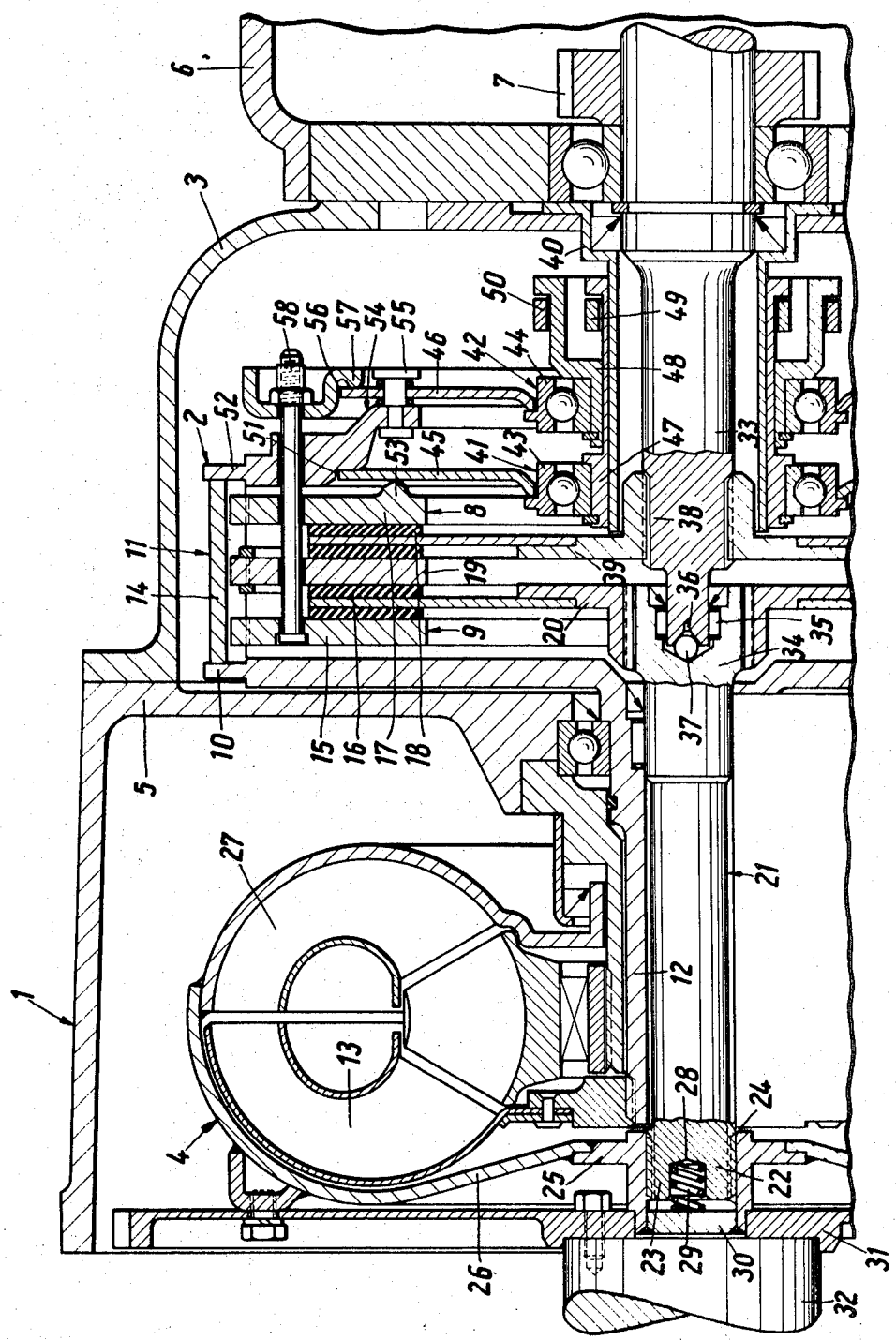
Inventor:
RICHARD HEITMANN
BY Craig, Antonelli, Stewart v Hill
Attorneys

TORQUE CONVERTER WITH DUAL CLUTCHES

BACKGROUND OF THE INVENTION

The present invention relates to a clutch for compound transmissions, and more particularly, to a clutch assembly for compound transmissions consisting of a hydrodynamic torque converter and a multistage change-speed transmission connected thereto, wherein the transmission input shaft of this change-speed transmission is adapted to be connected selectively by means of a separating clutch with the turbine impeller or, by means of an intermediate or bypass clutch, with the pump impeller of the torque converter.

A clutch assembly for a change-speed transmission having a torque converter which is in combination into a structural unit or group and which contains two friction disk clutches is known in the prior art. The transmission shafts associated with the clutch assembly can be selectively connected with the turbine impeller or with the pump impeller of the hydrodynamic torque converter. The clutches are disposed in the torque converter housing in the form of fluid friction disk clutches and are operated hydraulically with the use of torque converter oil. Clutch assemblies of this type exhibit a disadvantage in that the friction or entraining surfaces become gummy due to being flooded with torque converter oil, whereby, especially at low oil temperatures, the clutches are very slow to release the driving connection or do not release it at all. This results in a great amount of wear on the friction disks and prevents the noiseless shifting of the change-speed gear connected thereafter.

Furthermore, a clutch assembly for a planetary gear transmission with a hydrodynamic torque converter connected at the input thereof is also known. In this particular construction, the clutches serving for the production of several speeds are disposed in the planetary gear housing and thus are also subjected to oil flow. A dry clutch disposed in front of the torque converter makes possible the connection of the pump impeller with the transmission input shaft. The disadvantage that inheres in this construction is that several clutches must be actuated for the direct drive from the engine to the transmission unit, for which purpose operating elements which are disposed at large distances from one another are required.

SUMMARY OF THE INVENTION

It is the aim of the present invention to provide a clutch assembly for a compound gear of the aforementioned type, wherein dry clutches can be employed and wherein the clutch assembly is distinguished by simple operation, low structural height and economical manufacture.

The underlying problems are solved, in accordance with the present invention, by locating the separating clutch and the intermediate or bypass clutch, which are combined into one structural group, within an oil-free space or zone between the torque converter and the change-speed transmission. With this arrangement, the bypass clutch can be directly connected with the pump impeller, and the separating clutch with the transmission input shaft. A clutch assembly is thereby obtained which is distinguished by a compact construction and ensures safe operation even under extreme weather and load conditions as can occur, for example, in the driving operation of trucks.

By providing that the friction disk of the bypass clutch is connected with the hub of the pump impeller housing by means of an intermediate shaft extending through the torque converter, a simple connection is obtained between the pump impeller and the friction disk. Furthermore, the advantage of this arrangement is that commercially available torque converter constructions can be utilized.

Preferably, the intermediate shaft is a stub shaft which is axially displaceably supported between the hub of the pump impeller and the transmission input shaft. This stub shaft carries the friction disk of the separating clutch. Through this arrangement, the stub shaft is floatingly adjusted to a favorable position in the push or pull operation thereof, thus avoiding axial stresses in he drive connection. The stub shaft is held in the hub of the pump impeller housing under the effect of a compression spring. A ball which is inserted in a centering bore of the transmission input shaft serves as a stationary abutment. By utilizing the centering bore in the transmission input shaft, an inexpensive and simple abutment for the stub shaft is obtained.

Furthermore, it is advantageous to provide that the clutch housing of the structural group carries a clutch cover forming the mounting for a cup spring disk of the separating clutch and having a rocker abutment for a cup spring disk of the intermediate or bypass clutch. An advantageous mounting and bearing for the cup spring disks is thereby produced and, at the same time, another advantage is achieved in that the clutch cover can be used for several purposes. Still another advantage resides in the fact that the cup spring disk of the separating clutch and the cup spring disk of the bypass clutch are in engagement with the outer rings of release bearings. The control members of these release bearings are displaceably mounted in a concentric fashion on a centering sleeve attached at the transmission case, and thereby, an aligned operation with the release bearings is obtained in conjunction with a space-saving design.

BRIEF DESCRIPTION OF THE DRAWINGS

These and further objects, features and advantages of the present invention will become more apparent from the following description when taken in connection with the accompanying drawing which shows, for purposes of illustration only, an exemplary embodiment in accordance with the present invention, and wherein:

In the sole drawing, an exemplary embodiment of the invention is illustrated by means of a longitudinal section through a symmetrical half of the clutch assembly with the adjoining portions of the compound transmission for an automotive vehicle or the like.

DETAILED DESCRIPTION OF THE DRAWINGS

With reference now to the drawing which shows a compound transmission 1, a clutch assembly 2 is disposed in a housing 3 between the housing or casing 5 containing the torque converter 4 and the transmission case 6 for the transmission 7. The clutch assembly 2 essentially consists of a separating clutch 8 and of a bypass clutch 9 combined into a structural group 11 in clutch housing 10. The clutch housing 10 is connected by means of hollow shaft 12 with the turbine impeller 13 of the torque converter 4. The clutch housing 10 has an annular retaining member 14 wherein a clutch pressure plate 15 for a friction disk 16 of the bypass clutch 9 and a clutch pressure plate 17 for a friction disk 18 of the separating clutch 8 are disposed in an axially displaceable manner. Between the friction disks 16 and 18, a clutch abutment 19 is fixedly connected with the retaining member 14.

The hub 20 of the friction disk 16 in conjunction with bypass clutch 9 is connected with an intermediate shaft 22 fashioned as a stub shaft 21 for rotation therewith. This intermediate shaft is axially displaceable in the hollow shaft 12 of the turbine impeller 13. The stub shaft 21 has a connecting means such as a serrated or splined portion 24 on the end 23 associated with the torque converter 4 which engages the hub 25 of the pump impeller housing 26 associated with the pump impeller 27. A bore 28 is provided in the center of the stub shaft end 23 and a compression spring 29 is disposed in this bore and rests on the cover lid 30 of the hub 25 of the pump impeller housing 26. The hub 25 extends into a mounting flange 31 in driving connection with the crankshaft 32 of an internal combustion engine (not shown).

The stub shaft end 34 facing the change-speed gear input shaft 33 has a bearing bore 35 for receiving the input shaft, with the axial pressure of the stub shaft 21 being absorbed by a ball 37 inserted into the center recess 36 of the gear input shaft 33. The input shaft 33 also has a connecting means such as a serrated or splined portion 38 for connection with the hub 39 of the separating clutch 8 for rotation therewith. A centering sleeve 40 which is attached to the transmission case 6 serves as a guiding means for a release bearing 41 of the separating clutch 8 and for a release bearing 42 of the intermediate or bypass clutch 9. The outer rings 43 and 44 of the release bearings 41 and 42, respectively, are in engagement with a cup spring disk 45 of the separating clutch 8 and a cup spring disk 46 of the intermediate clutch 9, respectively. The control members 47, 48 of the release bearings 41, 42 which are connected with the inner rings of the bearings, are disposed concentrically with respect to each other and are actuated by release linkages, of which only the release forks 49, 50 are indicated.

The cup spring disk 45 of the separating clutch 8 is held in a mounting 51 on a clutch cover 52 and rests on an abutment 53 of the pressure plate 17. The clutch cover 52 is attached to the retaining member 14 of the clutch housing 10. On the outside 54 of the clutch cover 52, a clutch abutment 55 is disposed so as to support the cup spring disk 46 of the intermediate or bypass clutch 9. The outer rim 56 of the cup spring disk 46 is held in a release ring 57 which is connected with the pressure plate 15 of the bypass clutch 9 by several tension bolts 58 distributed around the circumference thereof.

In the position shown in the drawing, the bypass clutch 9 of the clutch assembly 2 is in the disengaged condition. During engine operation, the power thereof is transmitted by the crankshaft 32 to the pump impeller 27 and from there to the turbine impeller 13 with a corresponding torque increase. The turbine impeller 13 drives the hollow shaft 12 which, in turn, sets the clutch housing 10 into rotation. In order to shift into the desired gear from vehicle standstill, the release fork 49 of the release bearing 41 is moved, by a release linkage (not shown) to the right-hand side of the drawing, whereby the load on the pressure plate 17 of the separating clutch 8 is relieved and the driving connection is interrupted. Thereafter, the desired gear can be selectively engaged.

After subsequent engagement of the separating clutch 8, the drive is transmitted by way of the pressure plate 17 and the friction disk 18 of the separating clutch 8 to the gear input shaft 33 of the transmission 7, from which the drive is effected in the selected speed. The stub shaft 21 which is mounted in the hub of the pump impeller housing 26, together with the friction disk 16 of the bypass clutch 9, idle at the rotational speed of the pump during this operation.

If, by accelerating the vehicle in the selected engaged speed, the clutch limit of the torque converter is reached, the previously disengaged bypass clutch 9 is engaged by a device (not shown). During this procedure, the friction disk 16 of the bypass or intermediate clutch 9, including the pressure plate 15, is pressed against the clutch abutment 19 by the release ring 57 and the tension bolts 58 disposed along the circumference of the clutch assembly 2. The torque converter 4 is thereby bridged so that the stub shaft 21 and the gear input shaft 33 rotate at the same engine speed, that is, have the same number of revolutions. When the change-speed transmission again reenters the torque converter zone, the bypass clutch 9 is automatically disengaged. This operating procedure is analogously repeated in all shifting stages of the power transmission.

While I have shown and described only one embodiment in accordance with the present invention, it is understood that the same is not limited thereto but is susceptible of numerous changes and modifications as known to a person skilled in the art, and I, therefore, do not wish to be limited to the details shown and described herein but intend to cover all such changes and modifications as encompassed by the scope of the invention.

I claim:

1. A clutch assembly for transmissions, especially compound transmissions, having a hydrodynamic torque converter including a turbine impeller and a pump impeller, change-speed transmission means including an input shaft, first clutch means for selectively connecting said input shaft with said turbine impeller, and second clutch means for selectively connecting said input shaft with said pump impeller, characterized in that said first and second clutch means are combined into a structural group within an oil-free space between the torque converter and the transmission means, said first clutch means being a separating clutch and second clutch means being a bypass clutch, a pump impeller housing having a hub, shaft means, said bypass clutch having a friction disk and said friction disk being operatively connected with said hub by said shaft means, said shaft means including a stub shaft axially displaceably supported between said hub and said input shaft, a compression spring and a ball operatively associated with said stub shaft, said ball being inserted in a centering bore of said input shaft and serving as a stationary abutment while the stub shaft is held under the force of said compression spring.

2. A clutch assembly according to claim 1, wherein said stub shaft extends through said torque converter.

3. A clutch assembly according to claim 2 wherein said separating clutch further includes a friction disk, and wherein said input shaft operatively carries said separating clutch friction disk.

4. A clutch assembly according to claim 3, wherein said bypass clutch is adapted to be directly connected with said pump impeller and said separating clutch is adapted to be directly connected with said input shaft.

5. A clutch assembly for transmissions, especially compound transmissions, having a hydrodynamic torque converter including a turbine impeller and a pump impeller, change-speed transmission means including an input shaft, first clutch means for selectively connecting said input shaft with said turbine impeller, and second clutch means for selectively connecting said input shaft with said pump impeller, characterized in that said first and second clutch means are combined into a structural group with an oil-free space between the torque converter and the transmission means, said first clutch means being a separating clutch and said second clutch means being a bypass clutch, said structural group including a clutch housing carrying a clutch cover, a first cup spring disk operatively associated with said separating clutch and a second cup spring disk operatively associated with said bypass clutch, said clutch cover forming a mounting for said first cup spring disk and also having a rocker abutment for said second disk spring clutch.

6. A clutch assembly according to claim 5, wherein said bypass clutch is adapted to be directly connected with said pump impeller and said separating clutch is adapted to be directly connected with said input shaft.

7. A clutch assembly according to claim 5, further including release bearings having outer rings and control members, said first and second cup spring disks being operatively engageable with said outer rings.

8. A clutch assembly according to claim 7, wherein said transmission has a case with a centering sleeve attached thereto, said control members being located concentrically on said centering sleeve so as to be displaceable.

9. A clutch assembly according to claim 8, wherein said bypass clutch is adapted to be directly connected with said pump impeller and said separating clutch is adapted to be directly connected with said input shaft.

10. A clutch assembly for compound transmissions including a hydrodynamic torque converter with an impeller, a turbine, an impeller housing, an input and output, and a multispeed change-speed transmission means connected in the output of the torque converter and having its input adapted to be selectively connected by way of a separating clutch with the turbine wheel of the torque converter and by way of a bypass clutch with the impeller of the torque converter, characterized in that said separating clutch and said bypass clutch are constructed as dry friction disk clutches each including friction disk means and are combined axially behind one another into a structural unit within an oil-free space between the torque converter and the transmission means, said bypass clutch being adapted to be directly connected with said impeller and said separating clutch with said turbine, the friction disk means of said bypass clutch being connected with a hub of the impeller housing by way of an intermediate shaft extending through said torque converter and constructed as stub shaft which is axially displaceably supported between the hub of the impeller housing and the transmission input shaft, and said transmission input shaft carrying the friction disk means of the separating clutch.

* * * * *